(12) United States Patent
Phan et al.

(10) Patent No.: US 11,506,483 B2
(45) Date of Patent: Nov. 22, 2022

(54) METHOD, SYSTEM AND APPARATUS FOR SUPPORT STRUCTURE DEPTH DETERMINATION

(71) Applicant: Zebra Technologies Corporation, Lincolnshire, IL (US)

(72) Inventors: Raymond Phan, Mississauga (CA); Yuanhao Yu, Mississauga (CA); Richard Jeffrey Rzeszutek, Toronto (CA); Joseph Lam, North York (CA)

(73) Assignee: Zebra Technologies Corporation, Lincolnshire, IL (US)

(*) Notice: Subject to any disclaimer, the term of this patent is extended or adjusted under 35 U.S.C. 154(b) by 986 days.

(21) Appl. No.: 16/152,986

(22) Filed: Oct. 5, 2018

(65) Prior Publication Data

US 2020/0109939 A1 Apr. 9, 2020

(51) Int. Cl.
*G01B 11/22* (2006.01)
(52) U.S. Cl.
CPC ................................. *G01B 11/22* (2013.01)
(58) Field of Classification Search
CPC .............. G06T 7/62; G06T 7/0008; G06T 2207/20076; G06T 2207/10028; G01B 11/22; G01B 11/24
See application file for complete search history.

(56) References Cited

U.S. PATENT DOCUMENTS

| | | | |
|---|---|---|---|
| 5,209,712 A | 5/1993 | Ferri | |
| 5,214,615 A | 5/1993 | Bauer | |
| 5,408,322 A | 4/1995 | Hsu et al. | |
| 5,414,268 A | 5/1995 | McGee | |
| 5,423,617 A | 6/1995 | Marsh et al. | |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

International Search Report and Written Opinion for International Application No. PCT/US2019/049761 dated Nov. 15, 2019.

(Continued)

*Primary Examiner* — An H Do

(57) ABSTRACT

A method of determining a support structure depth of a support structure having a front and a back separated by the support structure depth includes: obtaining a point cloud of the support structure, and a mask indicating, for a plurality of portions of an image of the support structure captured from a capture pose, respective confidence levels that the portions depict the back of the support structure; selecting, from the point cloud, an initial set of points located within a field of view originating at the capture pose; selecting, from the initial set of points, an unoccluded subset of depth measurements, the depth measurements in the unoccluded subset corresponding to respective image coordinates; retrieving, from the mask, a confidence level for each of the depth measurements in the unoccluded subset; and based on the depth measurements in the unoccluded subset and the retrieved confidence levels, determining the support structure depth.

20 Claims, 9 Drawing Sheets

(56) References Cited

U.S. PATENT DOCUMENTS

| | | |
|---|---|---|
| 5,534,762 A | 7/1996 | Kim |
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,460,524 B1 * | 10/2016 | Curlander .......... G06K 7/10861 |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,133,951 B1 | 11/2018 | Mendonca et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 10,429,487 B1 | 10/2019 | Fowe |
| 10,699,421 B1 * | 6/2020 | Cherevatsky .......... G06K 9/623 |
| 10,783,656 B2 * | 9/2020 | Korobov .................. G06T 7/70 |
| 11,003,188 B2 | 5/2021 | Scott et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |

(56) References Cited

U.S. PATENT DOCUMENTS

| | | |
|---|---|---|
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0128195 A1 | 6/2005 | Houston et al. |
| 2005/0174351 A1 | 8/2005 | Chang |
| 2005/0213082 A1 | 9/2005 | Dibernardo et al. |
| 2005/0213109 A1 | 9/2005 | Schell et al. |
| 2005/0237320 A1 | 10/2005 | Itoh et al. |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1 | 8/2011 | Filimonova et al. |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0278782 A1 | 11/2012 | Pal et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1 | 5/2013 | Herwig |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0169681 A1 | 7/2013 | Rasane et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahern et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0088761 A1 | 3/2014 | Shamlian et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0112537 A1 | 4/2014 | Frank et al. |
| 2014/0129027 A1 | 5/2014 | Schnittman |

(56) References Cited

U.S. PATENT DOCUMENTS

| | | |
|---|---|---|
| 2014/0133740 A1 | 5/2014 | The Board Of Trustees Of The Leland Stanford Junior University |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1 | 7/2014 | Elbit Systems Ltd |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Xerox Corporation |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0195491 A1 | 7/2015 | Shaburov et al. |
| 2015/0212521 A1 | 7/2015 | Pack et al. |
| 2015/0235157 A1 | 8/2015 | Avegliano et al. |
| 2015/0243073 A1 | 8/2015 | Chen et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310348 A1 | 10/2015 | Dessouky et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Battelle Energy Alliance Llc |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1 | 9/2016 | Wu et al. |
| 2016/0260054 A1 | 9/2016 | High et al. |
| 2016/0271795 A1 | 9/2016 | Vicenti |
| 2016/0290805 A1 | 10/2016 | Irish et al. |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0030538 A1 | 2/2017 | Geisler et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0084037 A1 | 3/2017 | Barajas Hernandez et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178301 A1 | 6/2017 | Moraleda et al. |
| 2017/0178310 A1 | 6/2017 | Gornish |
| 2017/0193434 A1 | 7/2017 | Shah et al. |
| 2017/0205892 A1 | 7/2017 | Petrovskaya et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0218218 A1 | 8/2018 | Madan et al. |
| 2018/0251253 A1 | 9/2018 | Taira et al. |
| 2018/0276596 A1 | 9/2018 | Murthy et al. |
| 2018/0281191 A1 | 10/2018 | Sinyayskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |

(56) References Cited

U.S. PATENT DOCUMENTS

| | | |
|---|---|---|
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0025838 A1 | 1/2019 | Artes et al. |
| 2019/0034854 A1 | 1/2019 | Borodow et al. |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0108678 A1 | 4/2019 | Hazeghi et al. |
| 2019/0160675 A1 | 5/2019 | Paschal, II et al. |
| 2019/0178436 A1 | 6/2019 | Mao et al. |
| 2019/0180150 A1 | 6/2019 | Taylor et al. |
| 2019/0197439 A1 | 6/2019 | Wang |
| 2019/0197728 A1 | 6/2019 | Yamao |
| 2019/0236530 A1 | 8/2019 | Cantrell et al. |
| 2019/0271984 A1 | 9/2019 | Kingsford |
| 2019/0304132 A1 | 10/2019 | Yoda et al. |
| 2019/0392212 A1 | 12/2019 | Sawhney et al. |
| 2020/0049511 A1 | 2/2020 | Sithiravel et al. |
| 2020/0053325 A1 | 2/2020 | Deyle et al. |
| 2020/0068126 A1 | 2/2020 | Fink et al. |
| 2020/0111267 A1 | 4/2020 | Stauber et al. |
| 2020/0118064 A1 | 4/2020 | Perrella et al. |
| 2020/0150655 A1 | 5/2020 | Artes et al. |
| 2020/0192388 A1 | 6/2020 | Zhang et al. |
| 2020/0314333 A1 | 10/2020 | Liang et al. |
| 2020/0341151 A1 | 10/2020 | Yoshida |
| 2020/0410766 A1 | 12/2020 | Swaminathan |
| 2021/0019939 A1 | 1/2021 | Hu et al. |
| 2021/0163068 A1 | 6/2021 | Zhu et al. |
| 2021/0233305 A1 | 7/2021 | Garcia et al. |
| 2021/0271238 A1 | 9/2021 | Ko et al. |

FOREIGN PATENT DOCUMENTS

| | | |
|---|---|---|
| CN | 102214343 | 10/2011 |
| CN | 104200086 | 12/2014 |
| CN | 105989512 | 10/2016 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| FR | 3001567 | 8/2014 |
| GB | 2323238 | 9/1998 |
| GB | 2330265 | 4/1999 |
| JP | 2014170431 | 9/2014 |
| JP | 2016194834 | 11/2016 |
| JP | 2017016539 | 1/2017 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2017175312 | 10/2017 |
| WO | WO 2017187106 | 11/2017 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

Zeng et al. Multi-view Self-supervised Deep Learning for 6D Pose Estimation in the Amazon Picking Challenge, May 7, 2017, retrieved from the Internet at <URL:https://arxiv.org/pdf/1609.09475.pdf> on Oct. 16, 2019.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Ni et al., "Edge Detection and Feature Line Tracing in 3D-Point Clouds by Analyzing Geometric Properties of Neighborhoods," Remote Sensing, V8 19, pp. 1-20 (2016).

Norriof et al., "Experimental comparison of some classical iterative learning control algorithms", IEEE Transactions on Robotics and Automation, Jun. 2002, pp. 636-641.

Notice of allowance for U.S. Appl. No. 13/568,175 mailed on Sep. 23, 2014.

Notice of allowance for U.S. Appl. No. 13/693,503 mailed on Mar. 11, 2016.

Notice of allowance for U.S. Appl. No. 14/068,495 mailed on Apr. 25, 2016.

Notice of allowance for U.S. Appl. No. 14/518,091 dated Apr. 12, 2017.

Notice of allowance for U.S. Appl. No. 15/211,103 dated Apr. 5, 2017.

Olson, Clark F., et al. "Wide-Baseline Stereo Vision for terrain Mapping" in Machine Vision and Applications, Aug. 2010.

Oriolo et al., "An iterative learning controller for nonholonomic mobile Robots", the international Journal of Robotics Research, Aug. 1997, pp. 954-970.

Ostafew et al., "Visual Teach and Repeat, Repeat, Repeat: Iterative learning control to improve mobile robot path tracking in challenging outdoor environment", 1 EEE/RSJ International Conference on Intelligent robots and Systems, Nov. 2013, p. 176-181.

Park et al., "Autonomous mobile robot navigation using passive rfid in indoor environment," IEEE, Transactions on industrial electronics, vol. 56, issue 7, pp. 2366-2373 (Jul. 2009).

Perveen et al. (An overview of template matching methodologies and its application, International Journal of Research in Computer and Communication Technology, v2nl0, Oct. 2013) (Year: 2013).

Pivtoraiko et al., "Differentially constrained mobile robot motion planning in state lattices", journal of field robotics, vol. 26, No. 3, 2009, pp. 308-333.

Pratt W K Ed: "Digital Image processing, 10-image enhancement, 17-image segmentation", 2001-01-01, Digital Image Processing: PIKS Inside, New York: John Wily & Sons, US, pp. 243-258, 551.

Puwein, J., et al."Robust Multi-view camera calibration for wide-baseline camera networks,"in IEEE Workshop on Applications of computer vision (WACV), Jan. 2011.

Rusu, et al. "How to incrementally register pairs of clouds," PCL Library, retrieved from internet on Aug. 22, 2016 [http://pointclouds.org/documentation/tutorials/pairwise_incremental_registration.php.

Rusu, et al. "Spatial Change detection on unorganized point cloud data," PCL Library, retrieved from internet on Aug. 19, 2016 [http://pointclouds.org/documentation/tutorials/octree_change.php].

(56) References Cited

OTHER PUBLICATIONS

Rusu, et al. "Towards 3D Point cloud based object maps for household environments," Science Direct, vol. 56, issue 11, pp. 927-947 [http://www.sciencedirect.com/science/article/pii/S0921889008001140], Nov. 30, 2008. Retrieved from the internet on Jun. 15, 2022.
Schnabel et al. "Efficient RANSAC for Point-Cloud Shape Detection", vol. 0, No. 0, pp. 1-12 (1981).
Senthilkumaran, et al., "Edge Detection Techniques for Image Segmentation-A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=repl&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 mailed on Feb. 21, 2019.
United Kingdom Intellectual Property Office, Combined Search and Examination Report mailed Jan. 22, 2016 for GB Patent Application No. 1417218.3.
United Kingdom Intellectual Property Office, Combined Search and Examination Report mailed Jan. 22, 2016 for GB Patent Application No. 1521272.3.
United Kingdom Intellectual Property Office, Combined Search and Examination Report mailed Mar. 11, 2015 for GB Patent Application No. 1417218.3.
United Kingdom Intellectual Property Office, Combined Search and Examination Report mailed May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al.: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (Cybcon), IEEE, (Jun. 21, 2017).
Ziang Xie et al., "Multimodal Blending for High-Accuracy Instance Recognition", 2013 IEEE Rsj International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
Zhang et al., "Mobile computing and industrial augmented reality for real-time data access", Emerging Technologies and Factory Automation, 2001, 8th IEEE International Conference on Oct. 15-18, 2001, pp. 583-588, vol. 2.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Boden, "French retail chain to roll out NFC shelf edge labels to six hypermarkets" (Sep. 19, 2018), pp. 1-7.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façde Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Castorena et al., "Autocalibration of lidar and optical cameras via edge alignment", 2016 IEEE International Conference on Acoustics, Speech and Signal Processing (Mar. 20, 2016).
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Clark, "Casino to open world's first NFC-enabled supermarket", (Sep. 19, 2018), pp. 1-7.
Clark, "Jogtek launches passive NFC shelf-edge labels", (Sep. 19, 2018), pp. 1-6.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France.
Douillard, Bertrand, et al. "On the segmentation of 3D Lidar point clouds." Robotics and Automation (ICRA), 2011 IEEE International Conference on IEEE, 2011.
Dubois, M., et al., 'A comparison of geometric and energy-based point cloud semantic segmentation methods, European Conference on Mobile Robots (ECMR), pp. 88-93, 25-27, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

(56) References Cited

OTHER PUBLICATIONS

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, V191, pp. 148-160 (2016).
Hu et al., "An improved method of discrete point cloud filtering based on complex environment," International Journal of Applied Mathematics and Statistics, v48, i18 (2013).
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/CN2017/083143 dated Feb. 11, 2018.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/049761 dated Nov. 15, 2019.
International Search Report and Written Opinion from International Patent Application No. PCT/US2019/051312 dated Nov. 15, 2019.
International Search Report and Written Opinion from International Patent Application No. PCT/US2019/054103 dated Jan. 6, 2020.
International Search Report and Written Opinion for International Patent Application No. PCT/US2019/057007 dated Jan. 14, 2020.
International Search Report and Written Opinion from International Patent Application No. PCT/US2019/064020 dated Feb. 19, 2020.
International Search Report and Written Opinion for International Patent Application No. PCT/US2020/027948 dated Jul. 16, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
International Search Report and Written Opinion for International Patent Application No. PCT/US2021/024805 dated Aug. 2, 2021.
International Search Report and Written Opinion for International Patent Application No. PCT/US2021/057388 dated Feb. 2, 2022.
International Search Report and Written Opinion for International Patent Application No. PCT/IB2021/060948 dated Feb. 4, 2022.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kaikai Liu et al., "Enabling Context-Aware Indoor Augmented Reality via Smartphone Sensing and Vision Tracking", ACM Transactions on Multimedia Computing Communications and Applications, Association for Computer Machinery, US, vol. 12, No.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al.: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Meyersohn, "Walmart turns to robots and apps in stores", https://www.cnn.com/2018/12/07/business/walmart-robot-janitors-dotcom-store/index.html, Oct. 29, 2019.
Mitra et al., "Estimating surface normals in noisy point cloud data," International Journal of Computational geometry & applications, Jun. 8-10, 2003, pp. 322-328.

\* cited by examiner

METHOD, SYSTEM AND APPARATUS FOR SUPPORT STRUCTURE DEPTH DETERMINATION

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which information concerning the objects may be collected within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
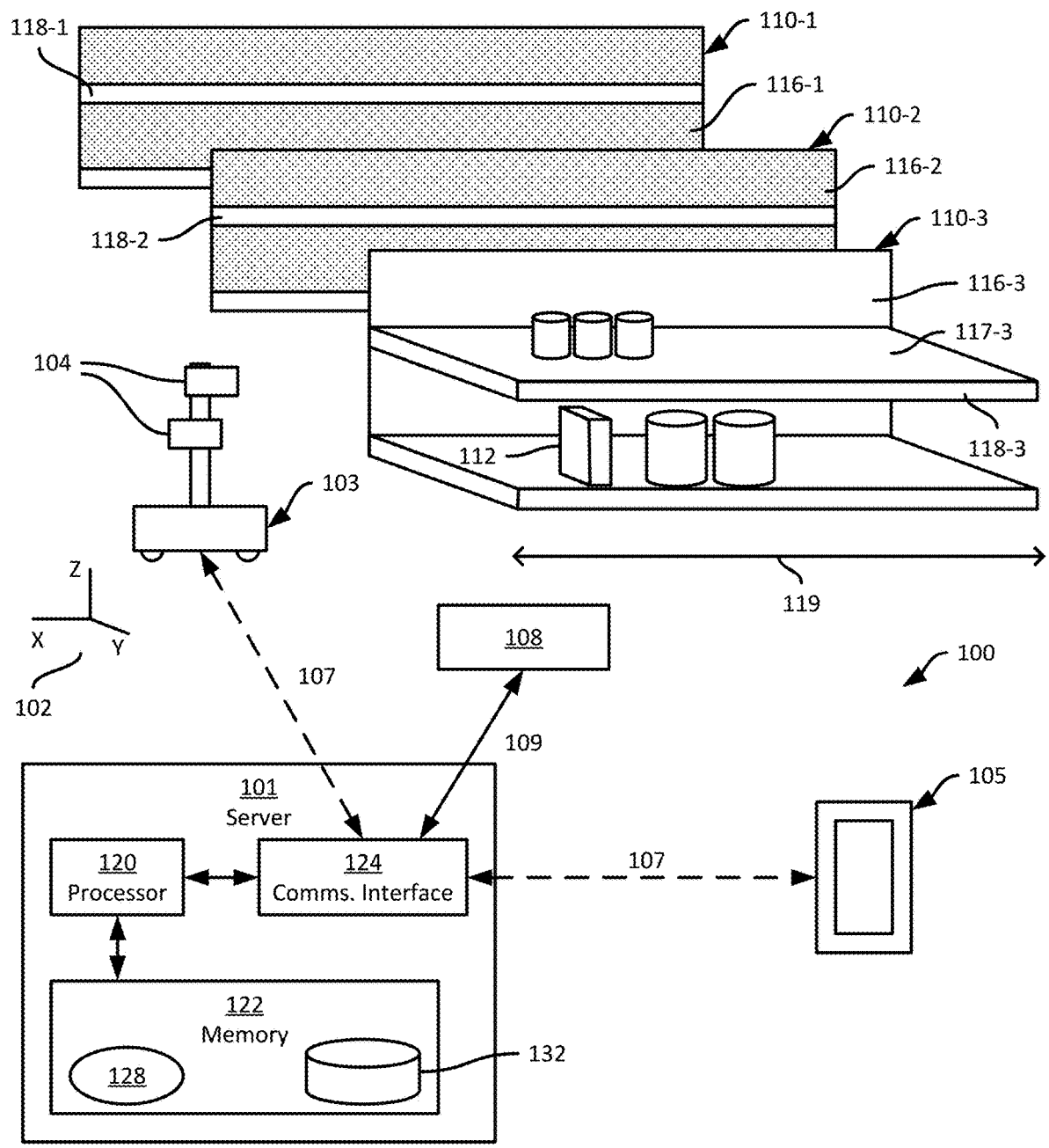
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of determining a support structure depth of a support structure having a front and a back separated by the support structure depth, the method comprising: obtaining (i) a point cloud of the support structure, and (ii) a mask indicating, for a plurality of portions of an image of the support structure captured from a capture pose, respective confidence levels that the portions depict the back of the support structure; selecting, from the point cloud, an initial set of points located within a field of view originating at the capture pose; selecting, from the initial set of points, an unoccluded subset of depth measurements, the depth measurements in the unoccluded subset corresponding to respective image coordinates; retrieving, from the mask, a confidence level for each of the depth measurements in the unoccluded subset; and based on the depth measurements in the unoccluded subset and the retrieved confidence levels, determining the support structure depth.

Additional examples disclosed herein are directed to a computing device for determining a support structure depth of a support structure having a front and a back separated by the support structure depth, the computing device comprising: a memory storing (i) a point cloud of the support structure, and (ii) a mask indicating, for a plurality of portions of an image of the support structure captured from a capture pose, respective confidence levels that the portions depict the back of the support structure; an imaging controller connected to the memory and configured to: select, from the point cloud, an initial set of points located within a field of view originating at the capture pose; select, from the initial set of points, an unoccluded subset of depth measurements, the depth measurements in the unoccluded subset corresponding to respective image coordinates; retrieve, from the mask, a confidence level for each of the depth measurements in the unoccluded subset; and based on the depth measurements in the unoccluded subset and the retrieved confidence levels, determine the support structure depth.

Further examples disclosed herein are directed to a computer-readable medium storing computer-readable instructions executable by a processor of a server, wherein execution of the computer-readable instructions causes the server to: obtain (i) a point cloud of the support structure, and (ii) a mask indicating, for a plurality of portions of an image of the support structure captured from a capture pose, respective confidence levels that the portions depict the back of the support structure; select, from the point cloud, an initial set of points located within a field of view originating at the capture pose; select, from the initial set of points, an unoccluded subset of depth measurements, the depth measurements in the unoccluded subset corresponding to respective image coordinates; retrieve, from the mask, a confidence level for each of the depth measurements in the unoccluded subset; and based on the depth measurements in the unoccluded subset and the retrieved confidence levels, determine the support structure depth.

FIG. 1 depicts a mobile automation system 100 in accordance with the teachings of this disclosure. The system 100 is illustrated as being deployed in a retail environment, but in other embodiments can be deployed in a variety of other environments, including warehouses, hospitals, and the like. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of support structures such as shelf modules 110-1, 110-2, 110-3 and so on (collectively referred to as shelves 110, and generically referred to as a shelf 110—this nomenclature is also employed for other elements discussed herein). In other examples, additional types of support structures may also be present, such as pegboards. Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees. The shelf edges 118 define a front of the shelves 110, separated from the shelf backs 116 by a shelf depth. A common frame of reference 102 is illustrated in FIG. 1. In the present example, the shelf depth is defined in the Y dimension of the frame of reference 102, while the shelf backs 116 and shelf edges 118 are shown as being parallel to the XZ plane.

The apparatus 103 is deployed within the retail environment, and communicates with the server 101 (e.g. via the link 107) to navigate, autonomously or partially autonomously, along a length 119 (illustrated in FIG. 1 as being parallel to the X axis of the frame of reference 102) of at least a portion of the shelves 110. The apparatus 103, autonomously or in conjunction with the server 101, is configured to continuously determine its location within the environment, for example with respect to a map of the environment. The apparatus 103 may also be configured to update the map (e.g. via a simultaneous mapping and localization, or SLAM, process).

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 (e.g. according to the paths mentioned above) and to capture shelf data, such as point cloud and image data, during such navigation.

The server 101 includes a special purpose imaging controller, such as a processor 120, specifically designed to control and/or assist the mobile automation apparatus 103 to navigate the environment and to capture data. The processor 120 can be further configured to obtain the captured data via a communications interface 124 for storage in a repository 132 and subsequent processing (e.g. to detect objects such as shelved products in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for performing various functionality, including control of the apparatus 103 to capture shelf data, post-processing of the shelf data, and generating and providing certain navigational data to the apparatus 103, such as target locations at which to capture shelf data. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the application 128 or subcomponents thereof and in conjunction with the other components of the server 101, the processor 120 is configured to implement various functionality related to controlling the apparatus 103 to navigate among the shelves 110 and capture data, as well as to obtain the captured data and perform various post-processing operations on the captured data. In the present example, as discussed below in greater detail, execution of the application 128 configures the server 101 to determine a shelf depth for one or more of the shelves 110, based on captured data (e.g. obtained from the apparatus 103) including point cloud and image data representing the shelves 110.

The processor 120, as configured via the execution of the control application 128, is also referred to herein as the controller 120. As will now be apparent, some or all of the functionality implemented by the controller 120 described below may also be performed by preconfigured special purpose hardware controllers (e.g. one or more logic circuit arrangements specifically configured to optimize the speed of image processing, for example via FPGAs and/or Application-Specific Integrated Circuits (ASICs) configured for this purpose) rather than by execution of the control application 128 by the processor 120.

Figure 2A:
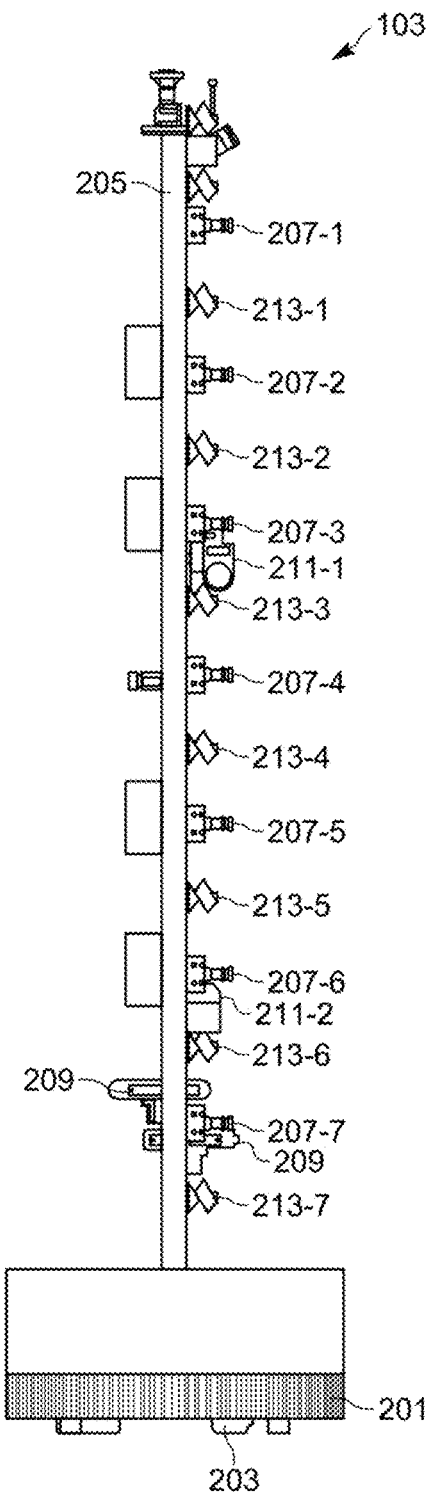
FIG. 2A depicts a mobile automation apparatus in the system of FIG. 1.
Figure 2B:
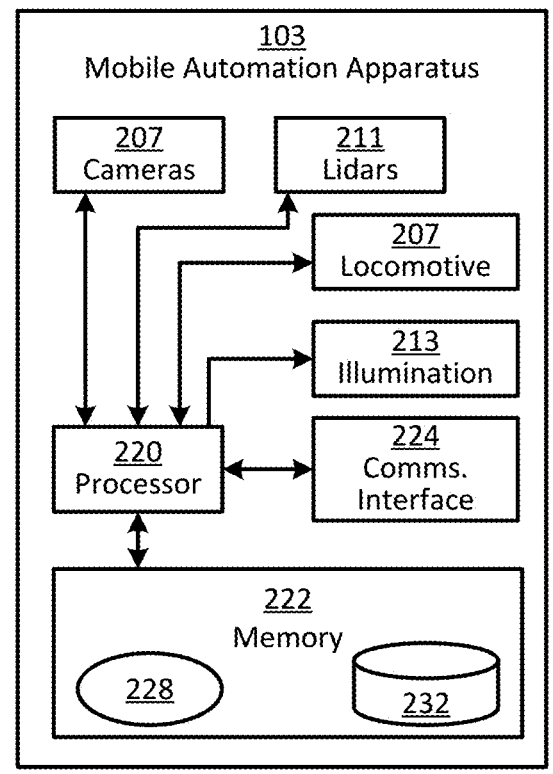
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in the common frame of reference 102 previously established in the retail facility, permitting data captured by the mobile automation apparatus 103 to be registered to the common frame of reference.

The mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions related to the navigation of the apparatus 103 and capture of data for subsequent processing, e.g. by the server 101. In some embodiments, such subsequent processing can be performed by the apparatus 103 itself via execution of the application 228. The application 228 may also be implemented as a suite of distinct applications in other examples.

The processor 220, when so configured by the execution of the application 228, may also be referred to as an imaging controller 220. Those skilled in the art will appreciate that the functionality implemented by the processor 220 via the execution of the application 228 may also be implemented by one or more specially designed hardware and firmware components, including logic circuit configurations optimized for image and/or depth sensor data processing, such as via specifically configured FPGAs, ASICs and the like in other embodiments.

The memory 222 may also store a repository 232 containing, for example, one or more maps representing the environment in which the apparatus 103 operates, for use during the execution of the application 228. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

As will be apparent in the discussion below, other examples, some or all of the processing performed by the server 101 may be performed by the apparatus 103, and some or all of the processing performed by the apparatus 103 may be performed by the server 101. That is, although in the illustrated example the application 128 resides in the server 101, in other embodiments some or all of the actions described below to determine the shelf depth of the shelves 110 from captured data may be performed by the processor 220 of the apparatus 103, either in conjunction with or independently from the processor 120 of the server 101. As those of skill in the art will realize, distribution of such computations between the server 101 and the mobile automation apparatus 103 may depend upon respective processing speeds of the processors 120 and 220, the quality and bandwidth of the link 107, as well as criticality level of the underlying instruction(s).

Figure 3:
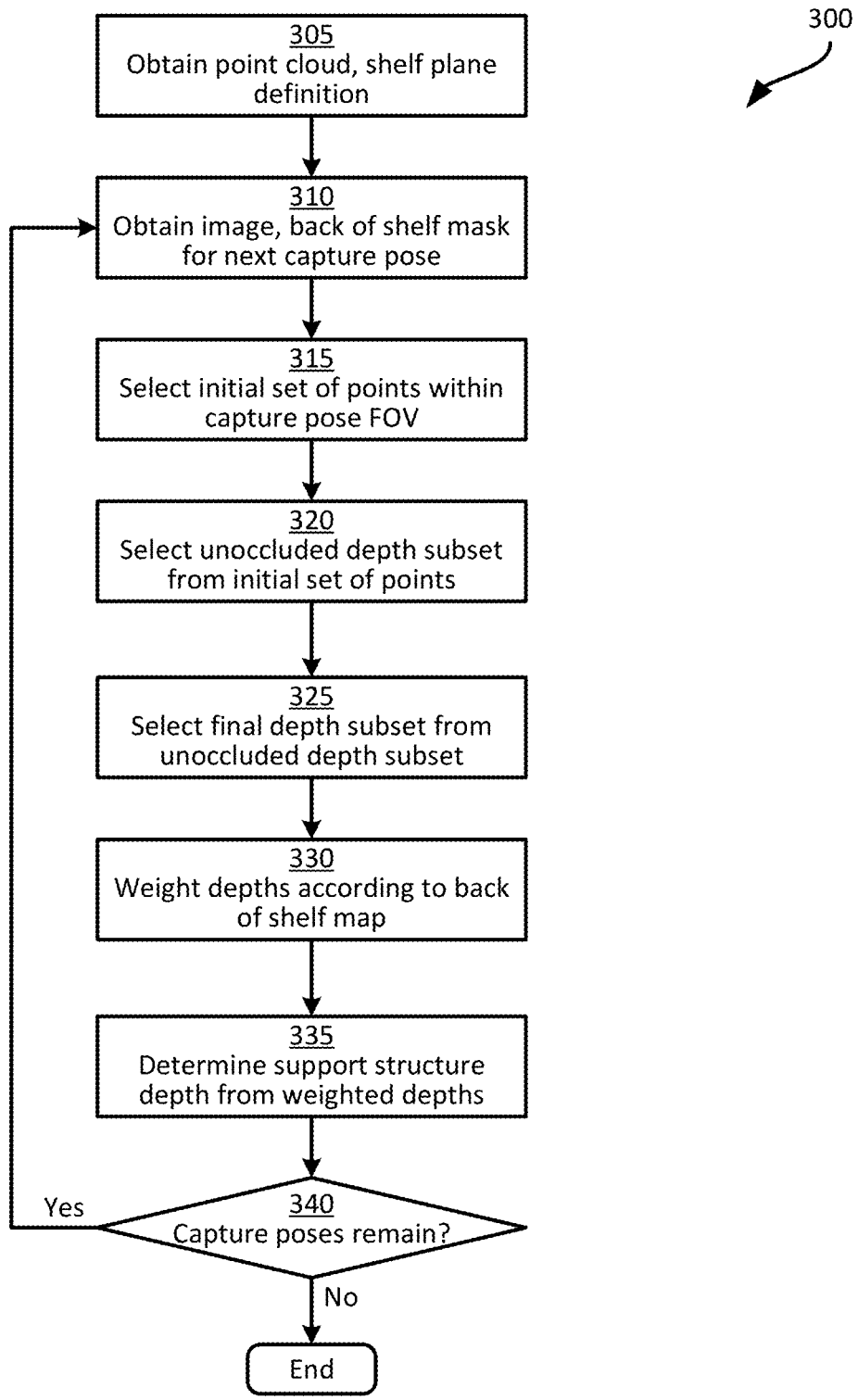
FIG. 3 is a flowchart of a method for determining a support structure depth.

The functionality of the application 128 will now be described in greater detail. In particular, the support structure depth determination mentioned above will be described as performed by the server 101. Turning to FIG. 3, a method 300 of determining support structure depth is shown. The method 300 will be described in conjunction with its performance by the server 101, with reference to the components illustrated in FIG. 1.

At block 305, the server 101 is configured to obtain a point cloud of the support structure, as well as a plane definition corresponding to the front of the support structure. In the present example, in which the support structures are shelves such as the shelves 110 shown in FIG. 1, the point cloud obtained at block 305 therefore represents at least a portion of a shelf module 110 (and may represent a plurality of shelf modules 110), and the plane definition corresponds to a shelf plane that corresponds to the front of the shelf modules 110. In other words, the plane definition defines a plane that contains the shelf edges 118.

The point cloud and plane definition obtained at block 305 can be retrieved from the repository 132. For example, the server 101 may have previously received captured data from the apparatus 103 including a plurality of lidar scans of the shelf modules 110, and generated a point cloud from the lidar scans. Each point in the point cloud represents a point on a surface of the shelves 110, products 112, and the like (e.g. a point that the scan line of a lidar sensor 211 impacted), and is defined by a set of coordinates (X, Y and Z) in the frame of reference 102. The plane definition may also be previously generated by the server 101 and stored in the repository 132, for example from the above-mentioned point cloud. For example, the server 101 can be configured to process the point cloud, the raw lidar data, image data captured by the cameras 207, or a combination thereof, to identify shelf edges 118 according to predefined characteristics of the shelf edges 118. Examples of such characteristics include that the shelf edges 118 are likely to be substantially planar, and are also likely to be closer to the apparatus 103 as the apparatus 103 travels the length 119 of a shelf module 110) than other objects (such as the shelf backs 116 and products 112). The plane definition can be obtained in a variety of suitable formats, such as a suitable set of parameters defining the plane. An example of such parameters includes a normal vector (i.e. a vector defined according to the frame of reference 102 that is perpendicular to the plane) and a depth (indicating the distance along the normal vector from the origin of the frame of reference 102 to the plane).

Figure 4A:
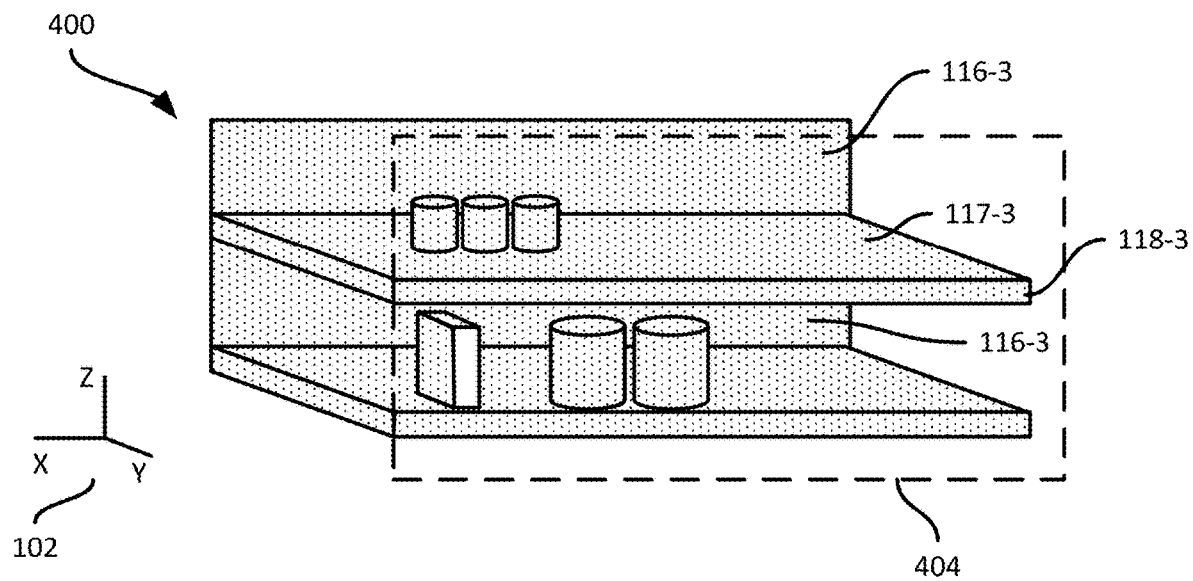
FIG. 4A is a diagram of a point cloud and shelf plane obtained at block 305 of the method of FIG. 3.

Referring to FIG. 4A, a point cloud 400 is illustrated, depicting the shelf module 110-3. The shelf back 116-3, as well as the shelf 117-3 and shelf edge 118-3 are therefore shown in the point cloud 400. Also shown in FIG. 4A is a plane definition 404 corresponding to the front of the shelf module 110-3 (that is, the plane definition 404 contains the shelf edges 118-3). The point cloud 400 and the plane definition 404 need not be obtained in the graphical form shown in FIG. 4A. As will be apparent to those skilled in the art, the point cloud may be obtained as a list of coordinates, and the plane definition 404 may be obtained as the above-mentioned parameters.

Returning to FIG. 3, at block 310 the server 101 is configured to obtain at least one image of the support structure, as captured (e.g. by the apparatus 103) from a capture pose. The capture pose is a position and orientation of capture device such as a camera 207, within the frame of reference. The apparatus 103, as noted above, is configured to traverse one or more shelf modules 110 and capture images of the shelf modules 110. As will now be apparent, each image capture occurs at a certain position and orientation of the apparatus 103. Further, the apparatus 103 includes a plurality of cameras 207, as shown in FIG. 2A, each with a predefined physical position and orientation on the apparatus 103. Thus, at each pose (i.e. position and orientation) of the apparatus 103, a plurality of images may be captured, one for each camera 207. Each image thus corresponds to a specific capture pose, meaning the physical position of the camera 207 according to the frame of reference 102.

Figure 4B:
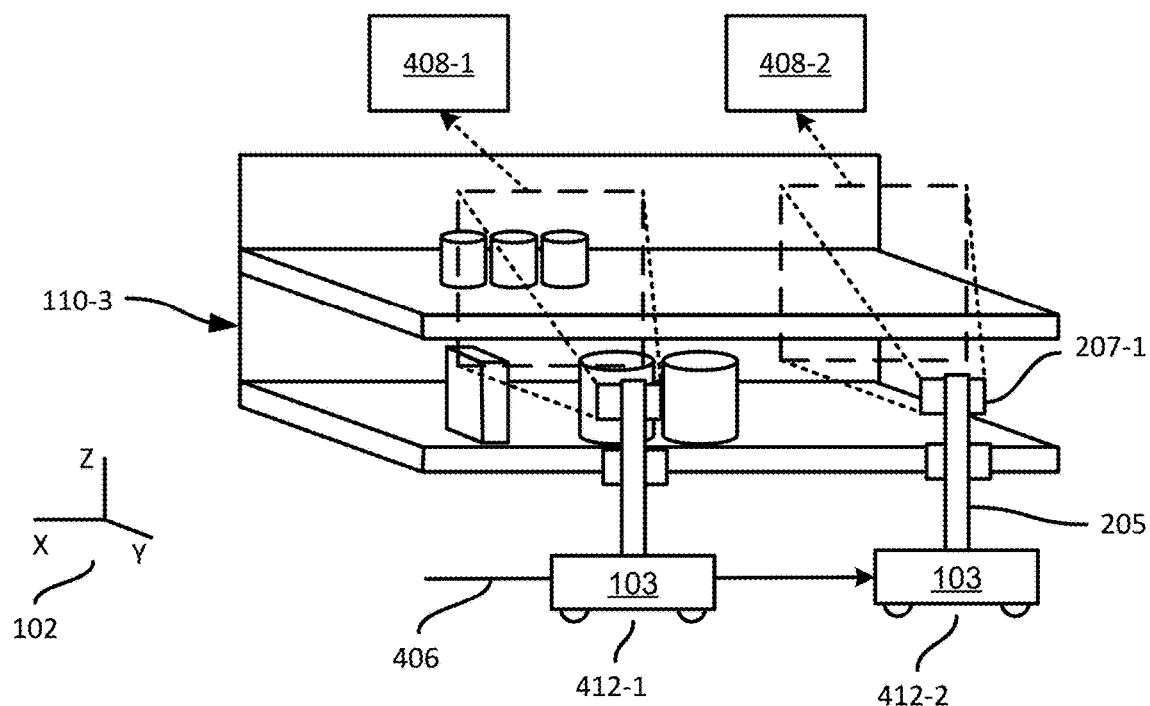
FIG. 4B is a diagram of example images captured by the apparatus of the system of FIG. 1, and obtained at block 310 of the method of FIG. 3.

FIG. 4B illustrates the capture of two example images 408-1, 408-2 by the apparatus 103 as the apparatus 103 traverses the shelf module 110-3 in a travel direction 406. In particular, at a first apparatus pose 412-1, the apparatus 103 controls the camera 207-1 to capture the first image 408-1. The position and orientation of the camera 207-1 at the time of capture of the first image 408-1 thus corresponds to a first capture pose. Later during the traverse of the shelf module 110-3, at a second apparatus pose 412-2, the apparatus 103 controls the camera 207-1 to capture the second image 408-2. As will now be apparent, the second image 408-2 corresponds to a second capture pose defined by the apparatus pose 412-2 and the physical orientation of the camera 207-1 relative to the apparatus 103. Each of the other cameras 207 may also be controlled to capture images at each apparatus pose 412. The images captured by those other cameras 207 correspond to yet more capture poses.

Returning to FIG. 3, at block 310 the server 101 is also configured to obtain, for example by retrieval from the repository 132, a mask also referred to as a back of shelf (BoS) mask or a BoS map. The mask corresponds to the at least one image mentioned above. That is, for each image obtained at block 310, one corresponding mask can also be obtained. The mask is derived from the corresponding image, and indicates, for each of a plurality of portions of the image, a confidence level that the portion depicts the shelf back 116. The portions can be individual pixels, if the mask has the same resolution as the image. In other examples, the mask has a lower resolution than the image, and each confidence level in the mask therefore corresponds to a portion of the image that contains multiple pixels.

Figure 5A:
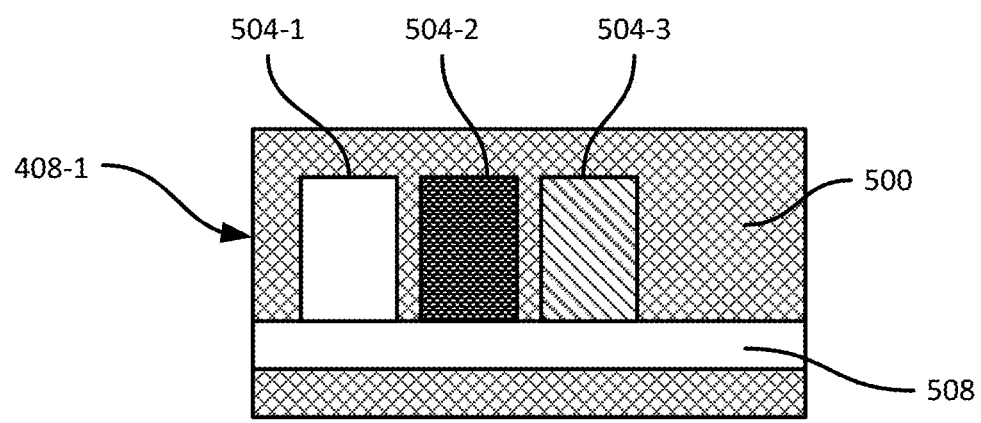
FIG. 5A is a diagram illustrating one of the images of FIG. 4B in greater detail.
Figure 5B:
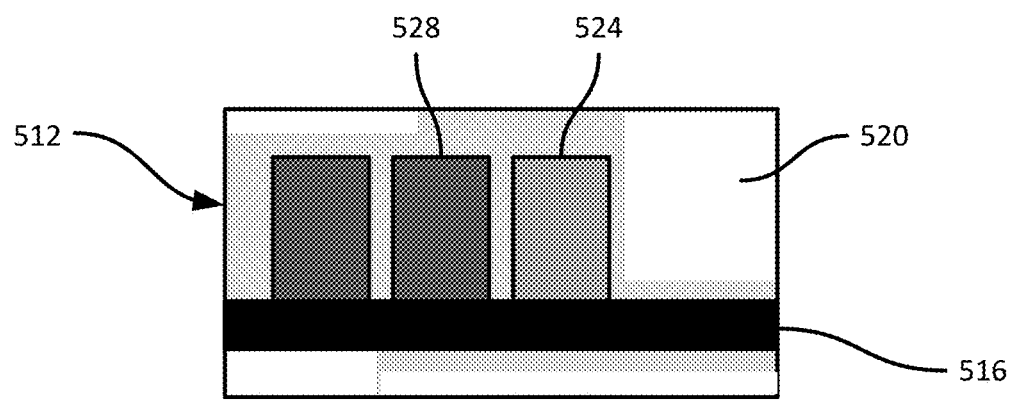
FIG. 5B is a diagram illustrating an example back of shelf mask corresponding to the image of FIG. 5A.

FIG. 5A illustrates the image 408-1 shown in FIG. 4A. As shown in FIG. 5A, a portion 500 of the image 408-1 depicts the shelf back 116-3. Portions 504-1, 504-2 and 504-3, meanwhile, depict products 112, and a portion 508 depicts the shelf edge 118-3. FIG. 5B illustrates a mask 512 derived from the image 408-1. Various mechanisms can be employed for generating the mask. For example, the image 408-1 can be decomposed into patches of a predefined size (e.g. 5×5 pixels), and each patch can be classified by a suitable classification operation to generate a confidence level, indicating a degree to which the patch matches a reference image of shelf back 116-3. The mask 512 can then be constructed by combining the confidence levels assigned to each patch.

In FIG. 5B, the confidence levels of the mask 512 are represented in grayscale. Darker regions of the mask 512 indicate lower confidence that the corresponding portion of the image 408-1 depicts the shelf back 116-3 (or, in other words, higher confidence that the corresponding portion of the image 408-1 does not depict the shelf back 116-3) and lighter regions of the mask 512 indicate higher confidence that the corresponding portion of the image 408-1 depicts the shelf back 116-3. For example, a region 516 indicates a confidence level of zero that the portion 508 of the image 408-1 depicts the shelf back 116-3. Another region 520 of the mask 512 indicates a maximum confidence level (e.g. 100%) that the corresponding portion of the image 408-1 depicts the shelf back 116-3. Other regions of the mask 512 indicate intermediate confidence levels. For example, a region 524 indicates a confidence level of about 50%, because the pattern shown on the product 112 depicted in the portion 504-3 of the image 408-1 resembles the shelf back 116-3. The region 528 of the mask 512, meanwhile, indicates a confidence level of about 30%.

Various other mechanisms for storing the confidence levels of the mask 512 are contemplated, beyond the grayscale image shown in FIG. 5B. For example, the confidence levels may be stored in a list, with associated sets of image coordinates indicating which portion of the image 408-1 corresponds to each confidence level.

Having obtained the point cloud, plane definition, image(s) and mask(s) at blocks 305 and 310, the server 101 is then configured to identify a subset of the points in the point cloud for which corresponding confidence levels exist in the mask 512. That is, the server 101 identifies points in the point cloud that were visible to the camera 207 at the time that the image was captured. The server 101 is then configured to use the depths of such points relative to the shelf plane in conjunction with the corresponding confidence levels from the mask 512, to determine a depth of the shelf back 116 relative to the shelf plane. The above functionality will be discussed below in greater detail.

Returning to FIG. 3, at block 315 the server 101 is configured to select an initial set of points from the point cloud, that fall within a field of view established by the capture pose mentioned above. Referring briefly to FIG. 4B, the field of view of the camera 207-2 is shown in dashed lines at each capture pose 412. The capture pose is defined according to the frame of reference 102, and according to predefined operational parameters (e.g. focal length) of the camera 207, the position and extent of the field of view within the frame of reference 102 can also be defined.

The server 101 can be configured, at block 315, to assess each point of the point cloud to determine whether the point falls within the field of view corresponding to the image obtained at block 310. For example, the server 101 can be configured to define the field of view as a volume within the frame of reference 102, and to determine whether each point of the point cloud falls within the defined volume. Points falling within the defined volume are selected for the initial set. In some examples, however, the server 101 is configured to perform a tree-based search to generate the initial set of points, as discussed below in connection with FIG. 6.

Figure 6A:
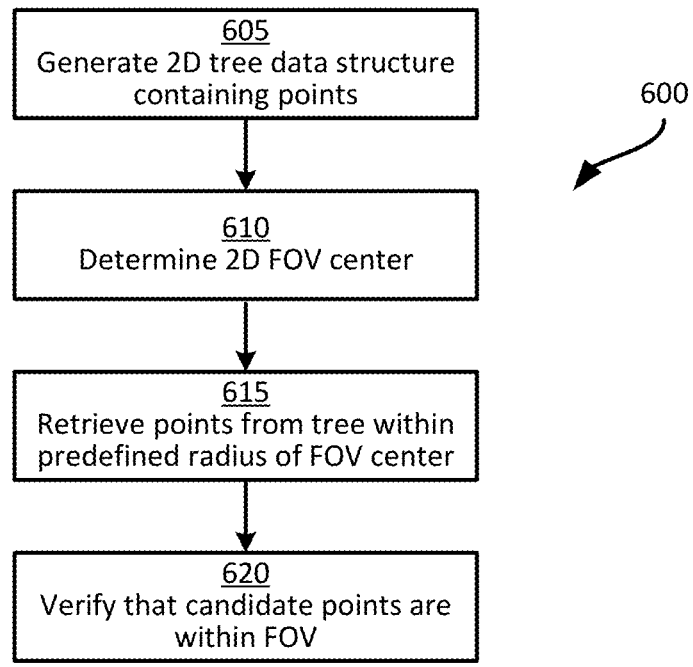
FIG. 6A is a flowchart of a method for performing block 315 of the method of FIG. 3.

Turning to FIG. 6A, a method 600 of selecting the initial set of points at block 315. At block 605, the server 101 is configured to generate a tree data structure, such as a k-d (k-dimensional) tree, an octree or the like. In the present example, a k-d tree is generated at block 605. The tree data structure contains, for each point in the point cloud, first and second dimension coordinates orthogonal to the depth of the point. That is, each point is represented in the tree by its X and Z coordinates according to the frame of reference 102, with the Y coordinate being omitted for the selection of the initial set (the Y coordinates are employed later in the method 300, as will be discussed below).

As will be understood by those skilled in the art, the k-d tree can be constructed by determining the median of one of the two dimensions mentioned above (e.g. the X dimension). Any points with an X coordinate below the median are allocated to a first branch of the tree, while the remaining points are allocated to a second branch. For each branch, the median of the other coordinate (Z, in the present example) is determined and the points allocated to the branch are again subdivided depending on whether their Z coordinates are above or below the Z median. This process is repeated, further subdividing the points between pairs of branches based on alternating dimensional medians (i.e. one division based on the X dimension, followed by one divisional based on the Z dimension, followed by a further division based on the X dimension, and so on), until each node of the tree contains a single point.

Figure 6B:
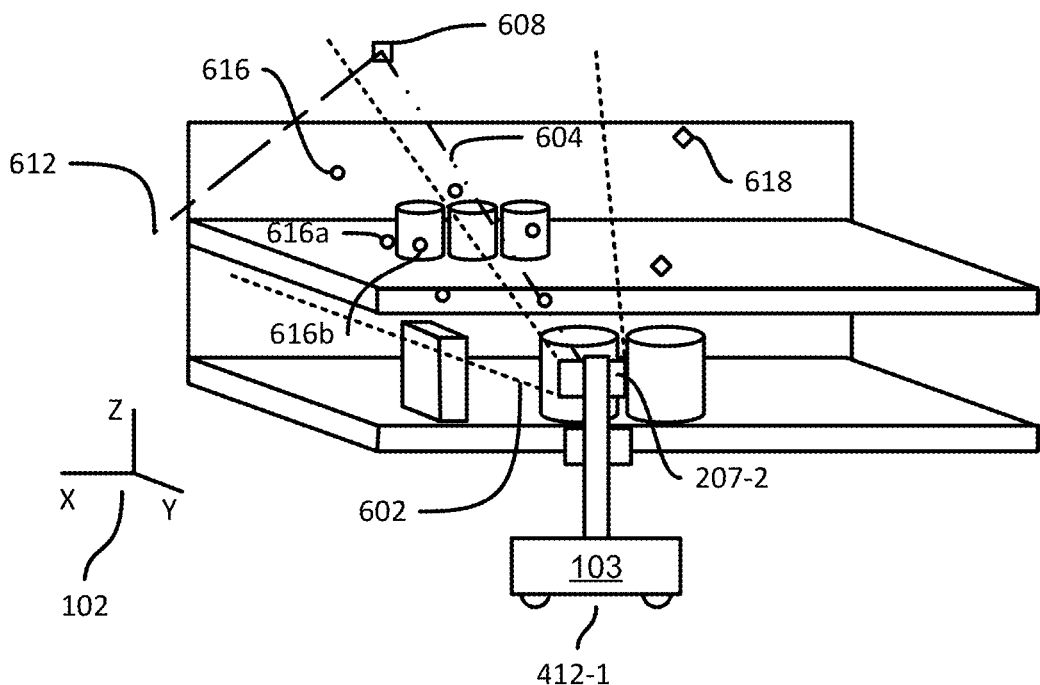
FIG. 6B is a diagram illustrating the performance of the method of FIG. 6A in connection with the point cloud of FIG. 4A.

At block 610, the server 101 is configured to determine coordinates of a center of the field of view, in the two dimensions represented in the tree. As noted above, the volume defined by the field of view is determined from operational parameters of the camera 207 and the capture pose. Referring to FIG. 6B, a field of view 602 of the camera 207-2 at the apparatus pose 412-1 is illustrated. The center of the field of view 602, in three dimensions, is defined by the line 604. To determine two-dimensional coordinates of the center of the field of view in two dimensions (i.e. in the X and Z dimensions), the server 101 is configured to select a predefined depth and to determine the coordinates at which the center line 604 intersects the predefined depth. The predefined depth can be stored in the memory 122 as a depth to be added to the depth of the shelf plane obtained at block 305. In other examples, the point cloud, shelf plane, capture poses and the like can be transformed to a frame of reference whose origin lies on the shelf plane itself (e.g. whose XZ plane is on the shelf plane), to simplify the computations discussed herein. As shown in FIG. 6B, the center line 604 intersects the predefined depth at a FOV center 608. The predefined depth is preferably selected to exceed the depth of the shelf back 116 (though the depth of the shelf back 116 may not be known precisely).

At block 615, the server 101 is configured to select points for the set by retrieving points from the tree that are within a predefined radius of the center 608. FIG. 6B illustrates a predefined radius 612 extending from the center 608. As will now be apparent to those skilled in the art, various mechanisms are available for conducting radius-based searches in trees such as a k-d trees. In the present example, as illustrated in FIG. 6B, points retrieved at block 615 include the example points 616, while other points 618 are not retrieved, as they are further from the center 608 than the radius 612.

At block 620, the server 101 can be configured to verify that the three-dimensional position of each point retrieved at block 615 falls within the FOV 602, as the predefined radius 612 may extend beyond the actual bounds of the FOV 602. In other examples, block 620 can be omitted. The verification at block 620, when conducted, may employ a transformation matrix, also referred to as a camera calibration matrix, configured to transform 3-dimensional coordinates from the point cloud into two-dimensional coordinates in an image frame of reference (e.g. pixel coordinates within the image 408-1). The verification at block 620 can therefore include, for each point retrieved at block 615, generating the corresponding image coordinates and determining whether the image coordinates are within the bounds of the image 408-1.

Returning to FIG. 3, having selected the initial set of points 616 within the FOV 602, at block 320 the server 101 is configured to select an unoccluded set of depth measurements from the points in the initial set. The initial set of points selected at block 315, although falling within the FOV 602, may nevertheless include points that were not imaged by the camera 207 because they are occluded from view by the camera 207 by other objects. For example, referring again to FIG. 6B, the point 616a, although within the FOV 602, corresponds to a portion of the shelf 117 that the camera 207-2 cannot image from the capture pose shown in FIG. 6B because a product 112 is between the camera 207-2 and the point 616a. The point 616a may appear in the point cloud because a lidar scanner is positioned differently than the camera 207-2, because a lidar scan captured the point 616a from a subsequent apparatus pose 412, or the like. The point 616a, in other words, is an occluded point for which the image 408-1 and the mask 512 have no corresponding data. At block 320, the server 101 is configured to remove such occluded points from further consideration, and retain data for unoccluded points, such as the point 616b.

Figure 7A:
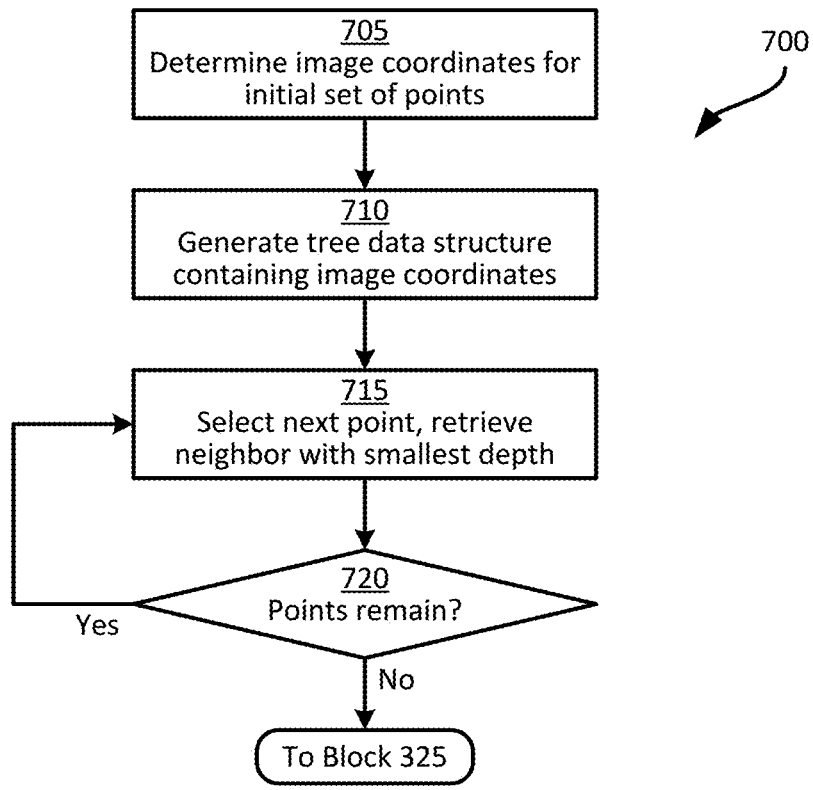
FIG. 7A is a flowchart of a method of performing block 320 of the method of FIG. 3.

In general, the selection at block 320 operates on an assumption that for any occluded point from the point cloud, an unoccluded point will also be present in the point cloud corresponding to the object responsible for the occlusion. It is further assumed at block 320 that the unoccluded point mentioned above is visible to the camera 207, and is therefore represented in the image 408-1. Turning to FIG. 7A, an example method 700 of selecting the unoccluded subset of depth measurements is illustrated.

Figure 7B:
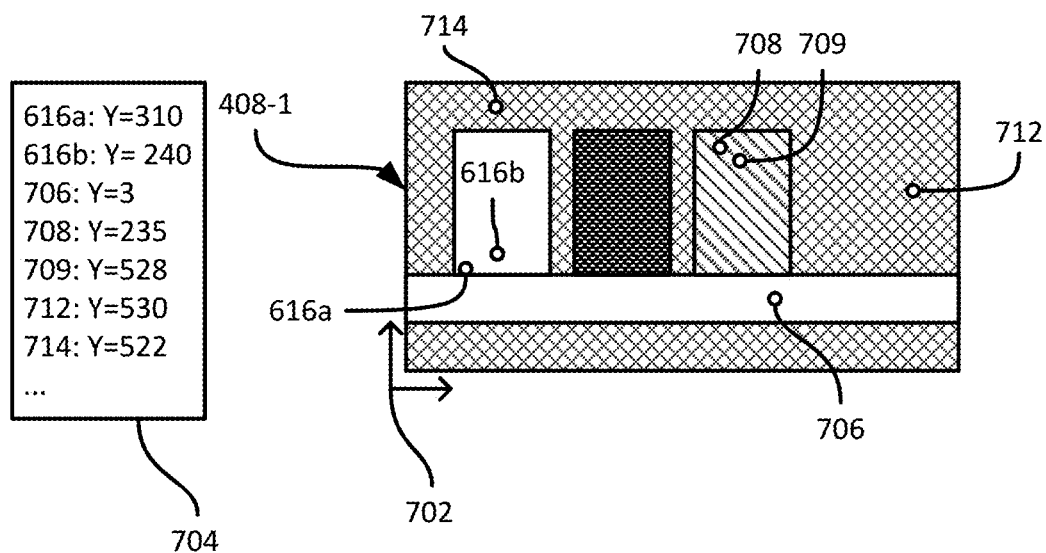
FIG. 7B is a diagram illustrating the performance of the method of FIG. 7A in connection with the image of FIG. 5A.

At block 705, the server 101 is configured to determine the image coordinates for each point in the initial set selected at block 315. As noted above, image coordinates can be obtained by use of the camera calibration matrix in a process also referred to as forward projection (i.e. projecting a point in three dimensions "forward" into a captured image, as opposed to back projection, referred to projecting a point in an image "back" into the point cloud). FIG. 7B illustrates the results of block 705 for the points 616a and 616b discussed earlier. The points 616a and 616b correspond to image coordinates defined according to an image frame of reference 702 (which in the present example is parallel with the XZ plane of the frame of reference 102). As seen in FIG. 7B, the depth measurements in the frame of reference 102 associated with the points 616 are also retained through the performance of the method 700, although they are not directly represented in the image coordinates (which are two-dimensional). The depth measurements may be maintained in a list 704 or other suitable format, in association with the image coordinates. Additional example points 706, 708, 709, 712 and 714 are also illustrated. As shown in the list 704 of depth measurements, the point 708 is located on the surface of a product, while the point 709 is behind the product, e.g. on the shelf back 116 (at a depth of 528 mm, compared to a depth of 235 mm for the point 708). The points 712 and 714 are also located on the shelf back 116, and have associated depths of 530 mm and 522 mm, respectively.

Figure 8A:
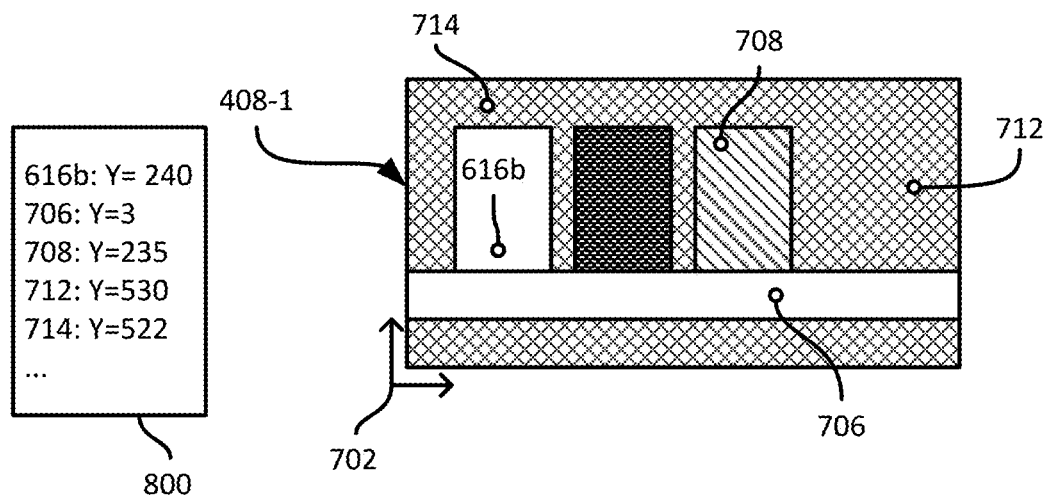
FIGS. 8A and 8B are diagrams illustrating an example performance of block 325 of the method of FIG. 3.

At block 710, the server 101 is configured to generate a tree data structure, such as a further k-d tree, containing the image coordinates determined at block 705. At block 715, the server 101 is configured to select neighbor groups of points. Specifically, for a selected point in the tree, the server 101 is configured to retrieve the nearest neighbors of that point (e.g. a predefined number of neighbors, neighbors within a predefined radius, or a combination of the above). The server 101 is further configured to select, from the nearest neighbors retrieved at block 715, the neighbor with the smallest depth. Thus, referring again to FIG. 7B and beginning with the point 616a, the nearest neighbor is the point 616b, and the lowest depth between the points 616a and 616b is the depth associated with the point 616b. The depth measurement (as well as the corresponding image coordinates) of the point 616b is therefore retained for inclusion in the unoccluded subset of depth measurements, while the point 616a is discarded. The performance of block 715 is repeated for each remaining point in the initial set, until a determination at block 720 indicates that no points remain to be processed. For the example points shown in FIG. 7B, When all points from the initial set have been processed and the subset of unoccluded depth measurements has been selected, the server 101 returns to block 325 of the method 300. At block 325, the server 101 can optionally be configured to select a final subset of depth measurements from the unoccluded subset of depth measurements. For example, taking the points shown in FIG. 7B, the unoccluded subset of depth measurements obtained therefrom is shown in FIG. 8A, in which it is seen that the points 616a and 709 have been discarded from the unoccluded subset 800. At block 325, the server 101 can be configured to perform one or more additional filtering operations to excluded further points from the unoccluded subset.

Figure 8B:
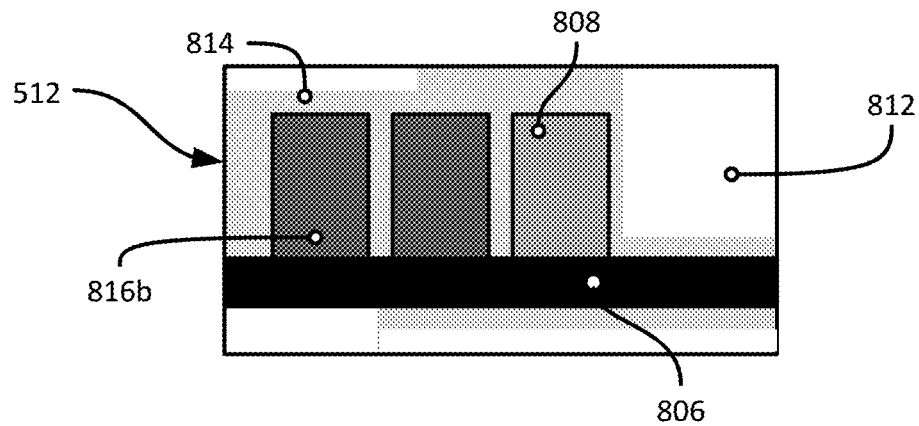

A first example of a filtering operation applied at block 325 is to discard any points with a BoS confidence level from the mask 512 that is below a predetermined threshold. The predetermined threshold, in the present example, is 55% (although it will be understood that various other thresholds may be applied instead). FIG. 8B illustrates the mask 512 with confidence levels 816b, 806, 808, 812 and 814 corresponding to the image coordinates of the points 616b, 706, 708, 712 and 714, respectively. In the present example, it is assumed that the confidence levels 816b, 806, 808, 812 and 814 are 30%, 0%, 50%, 100% and 90%, respectively. The points having confidence levels below 55% (that is, the points 616b, 706 and 708) are therefore discarded, and the final subset of depth measurements includes the depth measurements for the points 712 and 714, as well as their associated image coordinates.

Figure 8C:
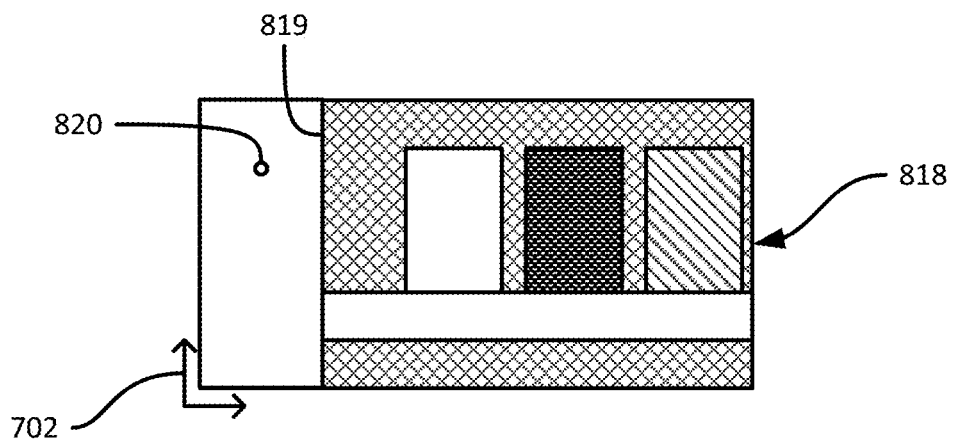
FIG. 8C is a diagram illustrating a further example performance of block 325 of the method of FIG. 3.

Other examples of filtering performed at block 325 includes discarding points with depth measurements that exceed a predefined maximum depth threshold. FIG. 8C illustrates another example image 818 taken from a different apparatus pose (and therefore a different capture pose) than the pose at which the image 418-1 was captured. In the image 818, an edge 819 of the shelf module 110-3 is visible, and certain points in both the image 818 and the point cloud therefore correspond to areas of the facility beyond the shelf module 110-3. For example, the point 820 may have an associated depth measurement of 2500 mm. The maximum threshold mentioned above may be selected as a maximum known shelf depth throughout the facility (e.g. 700 mm). The point 820 may therefore be discarded at block 325.

Figure 9:
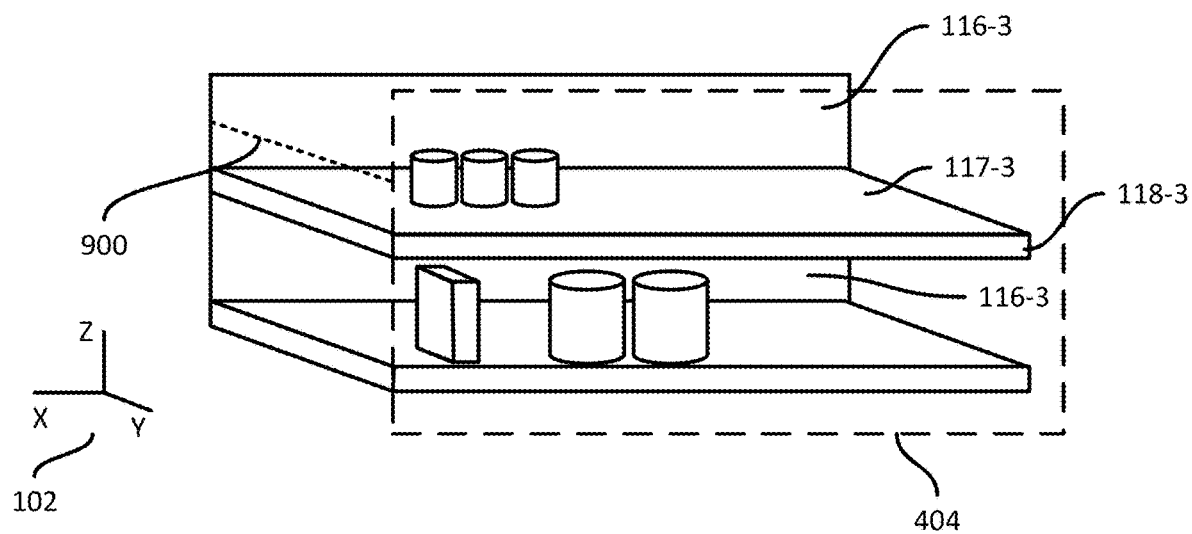
FIG. 9 is a diagram illustrating a support structure depth determined via performance of the method of FIG. 3.

Returning to FIG. 3, at block 330, the depth measurements of the final subset are weighted according to the corresponding confidence levels from the mask 512. Thus, in the present example, the depth measurements for the points 712 and 714 are weighted according to their respective confidence levels (100% and 90%, respectively). For example, the depths may be multiplied by their respective weights (e.g. 530×1 and 522×0.9). At block 335, the shelf depth is determined from the weighted depths. That is, the shelf depth determined at block 335 is a weighted average of the depth measurements in the final subset from block 325. In the present example, the weighted average of the depth measurements for the points 712 and 714 is obtained by summing the weighted depths, and dividing the result by the sum of the weights (i.e. 1.9 or 190%), yielding a result of 526.2 mm. FIG. 9 illustrates the determined shelf depth as a dashed line 900 extending from the shelf plane 404 (and perpendicular to the shelf plane 404).

At block 340, the server 101 is configured to determine whether any capture poses remain to be processed (i.e. whether additional apparatus poses for the current camera remain, or whether any additional cameras remain at the current apparatus pose). When the determination at block 340 is affirmative, the performance of the method 300 is repeated for any subsequent images and corresponding masks. When the determination at block 340 is negative, the performance of the method 300 ends. In some examples, block 335 is performed only following a negative determination at block 340, and uses the plurality of weighted final sets of depth measurements from each performance of block 330 to determine a single shelf depth for the shelf module 110. The shelf depth determined via performance of the method 300 can be returned, for example, to a further application of the server 101 (or to another computing device), for use in identifying gaps in the shelves 110 or other object status data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of determining a support structure depth of a support structure having a front and a back separated by the support structure depth, the method comprising:
   obtaining (i) a point cloud of the support structure, and (ii) a mask indicating, for a plurality of portions of an image of the support structure captured from a capture pose, respective confidence levels that the portions depict the back of the support structure;
   selecting, from the point cloud, an initial set of points located within a field of view originating at the capture pose;
   selecting, from the initial set of points, an unoccluded subset of depth measurements, the depth measurements in the unoccluded subset corresponding to respective image coordinates;
   retrieving, from the mask, a confidence level for each of the depth measurements in the unoccluded subset; and
   based on the depth measurements in the unoccluded subset and the retrieved confidence levels, determining the support structure depth.

2. The method of claim 1, further comprising:
   obtaining a further mask corresponding to a further image of the support structure captured from a further capture pose;
   selecting a further initial set of points;
   selecting a further unoccluded set of depth measurements;

retrieving a further confidence level for each of the depth measurements in the further unoccluded subset.

3. The method of claim 2, further comprising:
determining the support structure depth based on the depth measurements in the unoccluded subset, the depth measurements in the further unoccluded subset, the confidence levels and the further confidence levels.

4. The method of claim 1, wherein a capture pose defines a camera position and orientation within a common frame of reference.

5. The method of claim 1, wherein selecting the initial set of points comprises:
generating a tree data structure containing, for each point in the point cloud, first and second dimensions orthogonal to the support structure depth;
determining a field of view center in the first and second dimensions; and
retrieving, from the tree data structure, the initial set of points within a predefined radius of the field of view center.

6. The method of claim 1, wherein selecting the unoccluded subset of depth measurements comprises:
determining image coordinates corresponding to each of the initial set of points;
identifying neighbor groups of the image coordinates; and
for each neighbor group, selecting the image coordinate corresponding to the smallest depth measurement.

7. The method of claim 1, wherein determining the support structure depth comprises:
obtaining a plane definition corresponding to the front of the support structure;
transforming each depth measurement of the unoccluded subset of depth measurements to a depth relative to the plane definition;
weighting each transformed depth measurement according to the retrieved confidence levels; and
determining an average of the weighted depth measurements.

8. The method of claim 1, further comprising:
prior to determining the support structure depth, discarding depth measurements for which the retrieved confidence levels are below a minimum confidence threshold.

9. The method of claim 1, further comprising:
prior to determining the support structure depth, discarding depth measurements exceeding a maximum depth threshold.

10. A computing device for determining a support structure depth of a support structure having a front and a back separated by the support structure depth, the computing device comprising:
a memory storing (i) a point cloud of the support structure, and (ii) a mask indicating, for a plurality of portions of an image of the support structure captured from a capture pose, respective confidence levels that the portions depict the back of the support structure;
an imaging controller connected to the memory and configured to:
select, from the point cloud, an initial set of points located within a field of view originating at the capture pose;
select, from the initial set of points, an unoccluded subset of depth measurements, the depth measurements in the unoccluded subset corresponding to respective image coordinates;
retrieve, from the mask, a confidence level for each of the depth measurements in the unoccluded subset; and
based on the depth measurements in the unoccluded subset and the retrieved confidence levels, determine the support structure depth.

11. The computing device of claim 10, wherein the imaging controller is further configured to:
obtain a further mask corresponding to a further image of the support structure captured from a further capture pose;
select a further initial set of points;
select a further unoccluded set of depth measurements;
retrieve a further confidence level for each of the depth measurements in the further unoccluded subset.

12. The computing device of claim 11, wherein the imaging controller is further configured to:
determine the support structure depth based on the depth measurements in the unoccluded subset, the depth measurements in the further unoccluded subset, the confidence levels and the further confidence levels.

13. The computing device of claim 10, wherein a capture pose defines a camera position and orientation within a common frame of reference.

14. The computing device of claim 10, wherein the imaging controller is further configured, to select the initial set of points, to:
generate a tree data structure containing, for each point in the point cloud, first and second dimensions orthogonal to the support structure depth;
determine a field of view center in the first and second dimensions; and
retrieve, from the tree data structure, the initial set of points within a predefined radius of the field of view center.

15. The computing device of claim 10, wherein the imaging controller is further configured, to select the unoccluded subset of depth measurements, to:
determine image coordinates corresponding to each of the initial set of points;
identify neighbor groups of the image coordinates; and
for each neighbor group, select the image coordinate corresponding to the smallest depth measurement.

16. The computing device of claim 10, wherein the imaging controller is further configured, to determine the support structure depth, to:
obtain a plane definition corresponding to the front of the support structure;
transform each depth measurement of the unoccluded subset of depth measurements to a depth relative to the plane definition;
weight each transformed depth measurement according to the retrieved confidence levels; and
determine an average of the weighted depth measurements.

17. The computing device of claim 10, wherein the imaging controller is further configured to:
prior to determining the support structure depth, discard depth measurements for which the retrieved confidence levels are below a minimum confidence threshold.

18. The computing device of claim 10, wherein the imaging controller is further configured to:
prior to determining the support structure depth, discard depth measurements exceeding a maximum depth threshold.

19. A computer-readable medium having stored thereon computer-executable instructions, the instructions comprising:
- obtaining (i) a point cloud of the support structure, and (ii) a mask indicating, for a plurality of portions of an image of the support structure captured from a capture pose, respective confidence levels that the portions depict the back of the support structure;
- selecting, from the point cloud, an initial set of points located within a field of view originating at the capture pose;
- selecting, from the initial set of points, an unoccluded subset of depth measurements, the depth measurements in the unoccluded subset corresponding to respective image coordinates;
- retrieving, from the mask, a confidence level for each of the depth measurements in the unoccluded subset; and
- based on the depth measurements in the unoccluded subset and the retrieved confidence levels, determining the support structure depth.

20. The computer-readable medium of claim 19, the instructions further comprising:
- determining the support structure depth based on the depth measurements in the unoccluded subset, the depth measurements in the further unoccluded subset, the confidence levels and the further confidence levels.

* * * * *